Jan. 20, 1925.
E. GRIMM
1,523,538
CHAIN FASTENER
Filed March 10, 1924
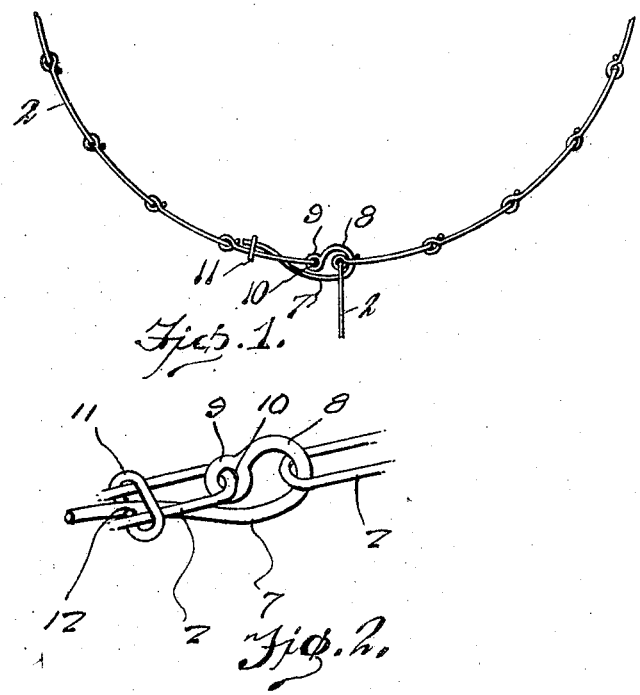
Inventor
E. Grimm
By Clarence A. O'Brien
Attorney Patented Jan. 20, 1925.

1,523,538

UNITED STATES PATENT OFFICE.

EDWARD GRIMM, OF FAIRPORT, IOWA.

CHAIN FASTENER.

Application filed March 10, 1924. Serial No. 698,250.

*To all whom it may concern:*

Be it known that I, EDWARD GRIMM, a citizen of the United States, residing at Fairport, in the county of Muscatine and State of Iowa, have invented certain new and useful Improvements in Chain Fasteners, of which the following is a specification.

This invention relates to an improved chain fastener which has been designed for detachably connecting the ends of one of the side chains of a tire chain together.

It is my object to provide a very simple fastener for the ends of one of the side chains of a suitable form of tire chain, wherein this fastener comprises a lever which is pivotally connected at one end with one of the end links of the side chains. This lever being bent upon itself in a direction toward the pivotally connected end and being extended beyond this end and bowed longitudinally to permit it to be extended between the side portions of the aforesaid end links so that it can be connected with a suitable retaining link or device.

A further object of the invention is to provide a chain fastener of the above mentioned character, which is simple in construction, inexpensive, strong and durable, and further well adapted for the purposes for which it is designated.

Other objects and advantages of this invention will become apparent during the course of the following description.

In the accompanaying drawing forming a part of this specification and in which like numerals designate like parts throughout the same:

Figure 1 is a side elevation of a portion of the tire chain showing one of the side chains equipped with my improved fastener.

Figure 2 is a detail perspective view of the improved fastening means for securing the free ends of the side chains.

For the purpose of connecting the free ends of the parallel side chains of a tire chain together, I provide the fastening means such as is more clearly shown in Figure 2 of the drawing and which comprises the elongated lever 7 which has its forward end curved as shown at 8 and terminating into an enlarged portion 9 provided with an eye 10 whereby a means is provided for connecting the curved portion to one of the ends of the chain. The curved portion 8 of the lever 7 is adapted to extend through the opposite end of the chain and the free end of the lever 7 will extend rearwardly between the side portions of the link of the chain to which the eye of the lever is connected and an elongated link 11 which is adapted for slidable movement on the link of the chain to which the lever is connected will engage the notch formed in the free end of the lever so as to hold the same in position whereby the ends of the chain are drawn together in the manner as clearly shown in the drawing. It is to be observed that the free end portion of the lever is bowed longitudinally and when the fastening device is in place as seen in Figure 2, the extremity of this bowed portion extends through and beyond the opposed side portions of the coacting chain links. Accidental displacement of the lever is thus guarded against. When it is desired to detach the chain from position on the tire, the sleeve 11 is released from engagement with the notch 12 of the lever and moves rearwardly out of engagement therewith. The free end of the lever 7 is then swung outwardly so as to enable the curved portion 8 to be disengaged from the end of the chain with which the same is associated whereby the chain may be readily removed from the tire.

Having thus described my invention, what I claim is:

A chain fastener comprising a lever provided at one end with an eye adapted to be pivotally connected with one end link of a side chain, said lever being bent upon itself adjacent said eye and having its free end portion extended beyond said eye and bowed longitudinally to extend between the side portions of said end links, said lever having a notch formed in the under side of the bowed portion and spaced inwardly from the extremity, and a transversely disposed link adapted to be slidably mounted on said chain link to permit said notch to be engaged therewith.

In testimony whereof I affix my signature.

EDWARD GRIMM.